United States Patent [19]
Lem et al.

[11] Patent Number: 5,576,358
[45] Date of Patent: Nov. 19, 1996

[54] COMPOSITION FOR USE IN FRICTION MATERIALS AND ARTICLES FORMED THEREFROM

[75] Inventors: Kwok W. Lem, Randolph, N.J.; John W. Lokerson, Panama City, Fla.; Young D. Kwon, Mendham, N.J.

[73] Assignee: AlliedSignal Inc., Morris Township, N.J.

[21] Appl. No.: 383,390

[22] Filed: Feb. 3, 1995

[51] Int. Cl.⁶ .................. C08J 5/14; C08K 3/08; B01D 5/00; C25B 5/00
[52] U.S. Cl. .................. 523/153; 523/155; 524/439; 524/440; 524/495; 524/15; 204/157.15; 204/155; 204/157.43
[58] Field of Search .................. 523/153, 155; 524/439, 440, 495, 15; 204/157.15, 155, 157.43

[56] References Cited

U.S. PATENT DOCUMENTS

| | | | |
|---|---|---|---|
| 3,671,542 | 6/1972 | Kwolek | 260/30.8 R |
| 3,835,118 | 9/1974 | Rhee et al. | 260/38 |
| 3,950,149 | 4/1976 | Fukuda | 51/298 R |
| 3,975,487 | 8/1976 | Cottis et al. | 264/210 F |
| 4,048,148 | 9/1977 | Morgan | 260/72.5 |
| 4,115,490 | 9/1978 | Munk | 264/26 |
| 4,118,372 | 10/1978 | Schaefgen | 528/190 |
| 4,161,470 | 7/1979 | Calundann | 260/40 |
| 4,272,625 | 6/1981 | McIntyre et al. | 528/183 |
| 4,388,423 | 6/1983 | Kaufman et al. | 523/153 |
| 4,403,012 | 9/1983 | Harpell et al. | 428/290 |
| 4,404,003 | 9/1983 | Harris | 51/298 |
| 4,412,841 | 11/1983 | Du Broff et al. | 44/10 |
| 4,415,363 | 11/1983 | Sanftleben et al. | 75/229 |
| 4,432,922 | 2/1984 | Kaufman et al. | 264/119 |
| 4,457,985 | 7/1984 | Harpell et al. | 428/224 |
| 4,537,823 | 8/1985 | Tsang et al. | 428/308.4 |
| 4,605,595 | 8/1986 | Tsang et al. | 428/413 |
| 4,613,535 | 9/1986 | Harpell et al. | 428/113 |
| 4,617,165 | 10/1986 | Tsang et al. | 523/122 |
| 4,623,574 | 11/1986 | Harpell et al. | 428/113 |
| 4,668,850 | 5/1987 | Matsuda et al. | 219/10.57 |
| 4,735,975 | 4/1988 | Iwata et al. | 523/152 |
| 4,737,402 | 4/1988 | Harpell et al. | 428/252 |
| 4,748,064 | 5/1988 | Harpell et al. | 428/113 |
| 4,748,193 | 5/1988 | Hays, Jr. | 523/156 |
| 4,831,086 | 5/1989 | Das et al. | 524/504 |
| 4,902,451 | 2/1990 | Inoue | 264/24 |
| 4,916,000 | 4/1990 | Li et al. | 428/105 |
| 4,920,159 | 4/1990 | Das et al. | 523/153 |
| 4,968,468 | 11/1990 | Leinweber | 264/113 |
| 4,997,067 | 3/1991 | Watts | 188/251 |
| 5,030,075 | 7/1991 | Leinweber | 425/125 |
| 5,104,599 | 4/1992 | Prevorsek et al. | 264/140 |
| 5,225,489 | 7/1993 | Prevorsek et al. | 525/151 |
| 5,272,216 | 12/1993 | Clark, Jr. et al. | 525/362 |
| 5,317,045 | 5/1994 | Clark, Jr. et al. | 523/300 |
| 5,360,587 | 11/1994 | Brotz et al. | 264/123 |

OTHER PUBLICATIONS

J. R. Vinson, et al., "The Behavior of Structures Composed of Composite Materials", 1986 Martinus Nijhoff Publishers, pp. 28–62.

Kirk–Othmer, Encyclopedia of Chemical Technology, 3rd Ed., vol. 4, pp. 202–212.3 (1978).

D. E. Clark, et al., "Ceramic Transactions: Microwaves: Theory and Application in Materials Processing", 1991, pp. 51–68.

French, "Crosslink Density from Sol–Gel Contents", A11(3) J. Macromol. Sci. 643–666 (1977).

Savage, "Carbon–Carbon Composites", Chapman & Hall, pp. 227–276, 1st Ed. (1993).

English Abstracts JP 6003 1 922 (1985).
English Abstracts JP 413 7 482 (1992).

*Primary Examiner*—Paul R. Michl
*Assistant Examiner*—LaVonda R. DeWitt
*Attorney, Agent, or Firm*—Michele G. Mangini; Roger H. Criss; Ernest D. Buff

[57] ABSTRACT

A composition containing a matrix, a fiber, a filler; and a friction modifier; wherein an effective amount of at least one of said components selected from the group consisting of fiber, filler, friction modifier and combinations thereof are cure promoting compounds having an effective aspect ratio such that the composition is rapidly cured in the presence of electromagnetic energy, and a process for curing such compositions.

Articles comprised of this composition are suitable for use in the production of friction materials, such as brake pads, drum linings, and clutches.

22 Claims, 1 Drawing Sheet

5,576,358

COMPOSITION FOR USE IN FRICTION MATERIALS AND ARTICLES FORMED THEREFROM

BACKGROUND OF THE INVENTION

1. Field of the Invention

The present invention relates to a composition and process for use in the manufacture of friction materials. More particularly, this invention relates to a composition capable of being rapidly cured by electromagnetic energy suitable for use in the manufacture of friction materials.

2. Description of the Prior Art

Friction materials for use as brake pads are conventionally made by mixing friction modifiers, reinforcing fibers, and matrixs until a desired blend is achieved. Then, the blend is placed in a mold, compressed to a desired density, and heated in a conventional electric or steam chamber for a fixed time period to complete a reaction between a curing agent and a matrix.

Also known are methods for manufacturing friction materials which do not require the use of an oven. However, such methods have a slow curing rate. See e.g., U.S. Pat. No. 4,617,165 (12 to 24 hour cure). It is also known that the cure time can be reduced to about four hours by evaporating the volatiles present in the pre-cured friction material blend in conventional ovens set at temperatures ranging between about 200° to 400° C. See U.S. Pat. Nos. 4,537,823 and 4,605,595. Although these methods are less time-consuming, the matrix for such materials produced therefrom does not cure uniformly.

Many friction materials produced according to known methods also must undergo a separate scorching process by means of flame and plasma in order to further improve their frictional surface. Not only are such conventional scorching processes expensive, but also the scorched layer resulting therefrom is very thin.

It is known that microwaves induce heating in certain types of compounds. See Newnham, et al., "Fundamental Interaction Mechanisms Between Microwaves and Matter", 21 *Ceramic Transactions, Microwave: Theory And Application in Materials Processing* 51–68 (1991). The concept of using electromagnetic energy to improve the microstructure of materials, i.e. to produce material which are free from defects such as cracks and voids, has been applied to processes for making formed coke in compacted carbonaceous masses as taught in U.S. Pat. No. 4,412,841. In the area of friction materials, high frequency wave heaters have been used to pre-heat resin sheets at low temperatures in order to decrease their porosity and thus achieve better compaction before they are cut and cured, see U.S. Pat. No. 3,950,149 (grinding wheel production), as well as to heat metal backing plates in order to soften the adhesive layer between the plate and the brake lining attached thereto. See U.S. Pat. No. 4,668,850.

It would be desirable to have a rapidly cureable composition suitable for use in the production of friction materials so that the time for their manufacture can be reduced. It would also be desirable to have such a composition whereby the friction materials comprised thereof would possess properties such as thick, uniformly cured preburnished or scorched sections, selective porosity and adjustable compressibility without sacrificing any of the mechanical properties associated with known friction materials.

SUMMARY OF THE INVENTION

The present invention provides a rapidly cureable composition having properties such as thick, uniformly cured preburnished sections, selective porosity and adjustable compressability, which is suitable for use in the production of friction materials, as well as a method for rapidly making such friction materials.

In accordance with this invention, there is provided a composition comprised of:

a) a friction modifier for adjusting the friction and wear performance of said composition;

b) a fiber for reinforcing said composition;

c) a filler for improving the consistency of said composition; and d) a matrix for binding the components of said composition, wherein an effective amount of at least one of said components selected from the group consisting of fiber, filler, friction modifier and combinations thereof are comprised of cure promoting compounds having an effective aspect ratio such that said composition is rapidly cured in the presence of electromagnetic energy.

Another aspect of this invention is to provide a method of making a friction material comprising:

a) combining a matrix, a fiber, a filler, and a friction modifier, wherein an effective amount of at least one of said components selected from the group consisting of fiber, filler, friction modifier and combinations thereof are comprised of cure promoting compounds having an effective aspect ratio such that said friction material is rapidly cured in the presence of electromagnetic energy, in a container to produce a mixture of materials;

b) shaping said mixture into said friction material; and c) exposing said friction material to electromagnetic radiation for a time sufficient to cure said matrix.

Another aspect of this invention is to provide a friction material for use in a brake pad having a coefficient of friction which varies from a wear surface to an engagement surface with a backing plate, said friction material being manufactured by:

a) combining a fiber, filler, friction modifier, binder and cure promoting compound having an effective aspect ratio whose conductivity promotes the coupling of electromagnetic energy to form a mixture;

b) placing said mixture in a mold;

c) subjecting said mixture while in said mold to electromagnetic radiation for a time sufficient to develop a desired thermal reaction in said cure promoting compound such that said binder is cured.

Friction materials such as brake pads produced according to the present invention are not only rapidly, uniformly and directly heated in situ, but they also possess a gradient crosslinked morphology. Thus, the highest friction coefficient will occur along the friction surface of the pad since at that location the maximum degree of cure occurs. Conversely, the lowest degree of cure will occur along the pad surface adjacent to the metal backing plate and opposite the friction surface, which thereby avoids deterioration of the friction materialplate bond. Another benefit of the gradient morphology is that the damping properties of the friction materials, and thus their impact and noise absorption properties, are also improved. Further, by simply increasing the curing temperature, the surface of the friction materials of the present invention will volatize and form thick, uniformly scorched layers, which thereby improves the frictional interaction of these materials with rotors.

As a result of the ability to selectively heat certain compounds within the composition, the performance of the friction materials produced in accordance with the present invention can also be engineered to meet specific applications, i.e. porosity can be adjusted to improve fade performance and wear resistance, see U.S. Pat. No. 4,735,975, or can be increased if a reduction in noise is desired. Also adjustable is the degree of cure within the composition of the present invention, and concomitantly the overall strength of the friction materials comprised thereof.

The process of the present invention also advantageously leads to a reduction in cycle time for preparing friction materials due to the rapid, simultaneous curing and scorching step as well as the omission of a post-mold cooling step. The friction materials produced therefrom, which may be formed in a variety of shapes and sizes, also possess mechanical and tribological properties which are equivalent or superior to those of prior art friction materials.

BRIEF DESCRIPTION OF THE DRAWINGS

The invention will be more fully understood and further advantages will become apparent when reference is made to the following detailed description of the preferred embodiments of the invention and the accompanying drawings, in which.

DETAILED DESCRIPTION OF THE INVENTION

Figure 1C:
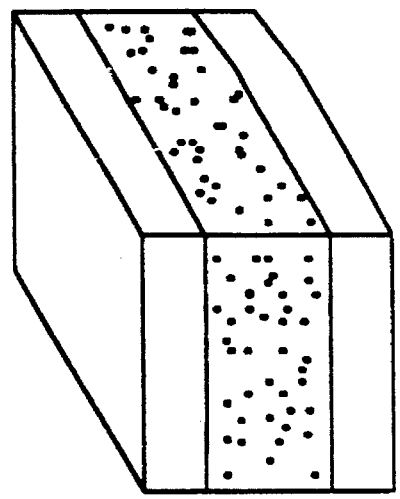
FIGS. 1 (a) through 1(c) are three-dimensional views of different arrangements of the cure promoting compounds within the friction material.

Unless indicated otherwise, all references are expressed in terms of weight percent.

The present invention is directed to a composition comprised of: a) a friction modifier for adjusting the friction and wear performance of said composition; b) a fiber for reinforcing said composition; c) a filler for improving the consistency and the processability of said composition; and d) a matrix for binding the components of said composition, wherein an effective amount of at least one of said components selected from the group consisting of fiber, filler, friction modifier and combinations thereof are comprised of cure promoting compounds having an effective aspect ratio such that said composition is rapidly cured in the presence of electromagnetic energy.

The first component of the composition of this invention is a friction modifier, which may be characterized as a friction powder, an abrasive friction modifier or a lubricant friction modifier. Examples of friction powder friction modifiers include cashew, nutshell, and friction dust. Examples of abrasive friction modifiers include magnesium oxide (MgO), ferric oxide ($Fe_3O_4$), and metal powders such as iron powders, copper dusts, aluminum powders and steel powders. Examples of lubricant friction modifiers include molybdenum disulfide ($MoS_2$), antimony trisulfite ($SbS_3$), graphite, and mixtures thereof.

The composition of the present invention contains, based upon the total weight of the composition, from about 0.1 to about 99 percent of friction modifier, and preferably from about 1 to about 60, more preferably from about 2 to about 50 and most preferably from about 3 to about 40 percent friction modifier.

The second component of the composition of this invention is a fiber component which may be selected from the group consisting of synthetic or organic fibers, ceramic fibers, metal fibers, and combinations thereof.

Suitable synthetic fibers include any type of polymer which is an isotropic in the solid state. Preferred isotropic polymers are those which are anisotropic because of their molecular structure. Particularly preferred anisotropic polymers are those which are thermotropic, i.e., anisotropic polymers which form an an isotropic melt when heated to a particular temperature range which is characteristic of the polymer. These particularly preferred thermotropic polymers when in the molten state exhibit shear or elongation flow tendency to orient in the shear or elongation flow direction. Such oriented melts exhibit after solidification a relatively greater structural and mechanical anisotropy as compared to isotropic polymers.

In general, anisotropic polymers for use in the practice of this invention are substantially linear rod shaped polymers containing a relatively high degree of aromaticity in the polymeric backbone. Illustrative of useful anisotropic polymers are wholly aromatic polyesters, as for example the polyesters described U.S. Pat. Nos. 5,104,599 and 5,225,489, which are both incorporated herein by reference.

Representative of useful polyazomethines are those described in U.S. Pat. No. 4,048,148; and representative of useful polyesteramides are those described in U.S. Pat. No. 4,272,625, both of which are incorporated herein by reference.

Preferred anisotropic polymers are those having recurring moieties derived from reaction of one or more compounds selected from the group consisting of aromatic diols, aromatic diamines, aromatic hydroxy amines, aromatic hydroxy acids and aromatic amino acids with one or more compounds selected from the group consisting of aromatic dicarboxylic acids, aromatic hydroxy acids and aromatic amino acids. More preferred anisotropic polymers are those having recurring moieties derived from reacting one or more compounds selected from the group consisting of aromatic diols, aromatic diamines, aromatic hydroxy amines, aromatic hydroxy acids, and aromatic amino acids with one or more aromatic dicarboxylic acids, or those derived by self reaction of aromatic hydroxy acids or aromatic amino acids, or those derived by reaction between two or more acids selected from the group consisting of aromatic hydroxy acids and aromatic amino acids.

Illustrative of useful organic fibers are those formed from phenolics or modified phenolics such as novolacs, phenolic cyanates, phenolic epoxies and the like, as well as from aromatic liquid crystalline polymers such as lyotropic liquid crystalline polymers. Examples of such organic fibers include those aforementioned as possible matrix compounds.

Other organic fibers for use in the practice of this invention include, for example. graphite and carbon fibers such as those derived from the carbonization of fibers comprised of polyethylene, polyvinylalcohol, saras, aramid, nylon, polybenzimidazole, polyoxadiazole, polyphenylene ("PPR"), petroleum and coal pitches (isotropic), mesophase pitch, cellulose and polyacrylonitrile.

In the case of aramid fibers, suitable aramid fibers formed principally from aromatic polyamide are described in U.S. Pat. No. 3,671,542, which is hereby incorporated by reference. Preferred aramid fibers will have a tenacity of at least about 20 g/d, a tensile modulus of at least about 400 g/d and an energy-to-break at least about 8 joules/gram, and particularly preferred aramid fibers will have a tenacity of at least about 20 g/d, a modulus of at least about 480 g/d and an energy-to-break of at least about 20 joules/gram. Most preferred aramid fibers will have a tenacity of at least about 20 g/denier, a modulus of at least about 900 g/denier and an energy-to-break of at least about 30 joules/gram. Particularly useful aramid fibers are those comprised of poly(phenylenediamine terephalamide) and poly(metaphenylene).

In the case of liquid crystal copolyesters, suitable fibers are disclosed, for example, in U.S. Pat. Nos. 3,975,487; 4,118,372; and 4,161,470, hereby incorporated by reference. Such copolyesters having tenacities of about 15 to about 30 g/d and preferably about 20 to about 2 5 g/d, and modulus of about 500 to 1500 g/d and preferably about 1000 to about 1200 g/d, are particularly desirable.

The composition contains, based upon the total weight of the composition, from about 0.1 to about 90 percent by weight, and preferably about 0.1 to about 50 percent by weight, of the above-mentioned synthetic or organic fibers.

Other fibers which may be present include inorganic fibers, such as ceramic or metal fibers. Illustrative of useful inorganic filament for use in the practice of this invention are those comprised of glass which include quartz, magnesia alumosilicate, non-alkaline zinc boroalumina, non-alkaline iron aluminosilicate, cadmium borate, and alumina which include "saffil" fibers in eta, delta, and theta phase forms; asbestos; boron; ceramics such as metal and non-metal oxides as for example, silicon carbide, titanium boride, zirconium carbide and boron nitride; and metals such as nickel, steel, iron, bass, aluminum, copper, titanium and alloys such as manganese, titanium, nickel and aluminum.

In the preferred embodiments of this invention, the useful inorganic fibers are glass fibers such S-glass, $S_2$-glass, E-glass and the like; ceramic fibers such as silicon carbide fibers and the like; and aromatic polyamide or polyester fibers such as aramids, liquid crystalline copolyesters and the like. The composition of the present invention contains from about 0 to about 90 percent, and preferably about 1 to about 60 of non-metallic inorganic filaments, and from about 0 to about 90 percent, and preferably 1 to about 65 percent of metallic fibers.

The fibers may be arranged in networks having various configurations. As used herein, a "fiber" is defined as an elongated body, the length dimension of which is much greater than the dimensions of width and thickness of any cross-section. Accordingly, the term fiber as used herein includes a monofilament elongated body, a multifilament elongated body, a ribbon, a strip, a film and the like having regular or irregular cross sections, as well as a plurality of any one or combination of the above. For example, a plurality of filaments can be grouped together to form twisted or untwisted fiber bundles in various alignments. The filaments or yarn may be formed as a felt, knitted or lo woven (plain, fiber basket, satin and crow feet weaves, etc.) into a network, fabricated into non-woven fabric, arranged in parallel array, layered, or formed into a woven fabric by any of a variety of conventional techniques.

In preferred embodiments of the invention, the fibers are aligned substantially parallel and unidirectionally to form a uniaxial layer in which a matrix material substantially coats the individual fibers. Two or more of these layers can be used to form a layer with multiple layers of coated undirectional fibers in which each layer is rotated with respect to its adjacent layers. An example is a composite with the second, third, fourth and fifth layers rotated 45°, −45°, 90° and 0° with respect to the first layer, but not necessarily in that order. Other examples include a layer with a 0°/90° layout of fiber or filaments. Procedures and materials for the fabrication of such preferred networks are described in detail in U.S. Pat. Nos. 4,457,985; 4,613,535; 4,748,064; 4,916,000; 4,403,012; 4,623,574; and 4,737,402, which are incorporated herein by reference.

The third component of the claimed composition is a filler. Any filler known in the art is suitable for use in this invention including, but not limited to rubber scrap, whiting, mica, seacoal, wallestonite, alumina, silicon carbide, kyanite, clay, silicas, brass chips, copper powder, zinc, iron powder, aluminum, bartyles, ($BaSO_4$) and combinations thereof.

The composition of the present invention contains, based upon the total weight of the composition, from about 0.1 to about 99 percent, preferably from about 1 to about 80, more preferably from about 5 to about 75, and most preferably from about 3 to about 60 percent of a filler.

The fourth component of the claimed invention is a is a matrix (or "binder") selected from a thermoplastic resin, a thermoset resin, and combinations thereof. The type of resin employed is not critical and essentially any thermoplastic or thermoset resin known to those of skill in the art can be used.

Preferred resins for use as the matrix component of the composition of this invention are the non-heterocyclic aromatic polymers such as phenolics and phenolic derivatives, aromatic polyamides, aromatic polyesters and other aromatic polymers such as polyphenylene and mesophase pitch, and copolymers and mixtures thereof. More preferred resins are phenolic resins and various modified phenolic resins as for example, phenolic resins in which the hydroxyl group has been derivatized as for example, with a crosslinkable moiety such as cyanate, epoxy and alkyl groups. The most preferred resins are the high temperature resistant resins which do not generate volatiles during curing such as cyanated phenolics and phenolic-triazine resins, more preferably cyanated phenolics. Examples of cyanated phenolic and phenolic-triazine resins may be found in, for example, U.S. Pat. No. 4,831,086, which is incorporated by reference herein.

The composition of the present invention contains, based upon the total weight of the composition, from about 0.5 percent to about 99 percent, preferably from about 3 percent to about 60 percent, more preferably from about 6 percent to about 55 percent and most preferably from about 6 percent to about 45 percent by weight, of the above-mentioned matrices.

In general, the matrix, fiber, filler, and friction modifier components which are suitable for use in the present invention are commercially availlable or could be conveniently manufactured by the techniques described in the literature cited for each respective component.

One important feature of this invention is that a sufficient amount of at least one of the components selected from the group consisting of friction modifiers, fillers, fibers, and combinations thereof, possesses an effective configuration or "aspect ratio" which will effectively absorb the electromagnetic energy such that the X-Y plane of the composition is uniformly cured to the degree desired. As used herein, the term "aspect ratio" is the ratio of the length of the component to its diameter.

Another important feature is that a sufficient amount of those components having such a suitable aspect ratio also are "cure promoting" compounds. As used herein, "cure promoting" compounds refer to the components which have a dielectric loss of from about 0.000001 to about 1.0, preferably from about 0.05 to about 0.6, and/or have a resistivity of from about $1\times10^{-10}$ to about $1\times10^{+8}$ ohms-cm, preferably from about $1\times10^{-8}$ to about $1\times10^{+4}$ ohms-cm.

Examples of "cure promoting" friction modifiers and/or filler components suitable for use in this invention have a configuration selected from the group consisting of: 1) "ground", "chopped" or "short" cylinder; 2)"long" cylinder; 3) plate; 4) particle; or 5) combinations thereof. Similarly, suitable "cure promoting" fiber components may be either in a "ground", "chopped" or "short" cylinder configuration, a "long" cylinder configuration, or a combination thereof.

As used herein, the terms "chopped" or "short" fiber refers to fibrous or acicular fibers having a length equal to or greater than about 0.01 cm, a diameter equal to or less than about 1 cm, and an "aspect ratio" of greater than about 1.05. The aspect ratio of the short fibers is preferably from about 1.5 to about 3000, and most preferably from about 1 to about 2500.

As used herein, "long fibers" refers to fibers having a diameter similar to those of short fibers along with very long lengths of from about 1 cm to about infinity. The aspect ratio of long fibers is at least greater than about 3.

As used herein, "particle" refers to a structure of the friction modifier or filler components having a length approximately equal to its diameter, and an aspect ratio of about 1.

As used herein, "plate" refers to a structure of the friction modifier or filler having a length equal to or greater than about 0.001 cm, a diameter equal to or less than about 10 cm, and an "aspect ratio" of less than about 0.995.

Although there are no upper limits on the aspect ratio or the length of the component, and there is no lower limit on the diameter of the particle, effective aspect ratios of "cure promoter" compounds suitable for use in the present invention are preferably greater than about 0.1, more preferably greater than about 0.2, and most preferably greater than about 0.3.

In the preferred embodiments of this invention, the cure promoting o compounds of this invention have an average length of about 0.00005 cm to about 5 cm, more preferably from about 0.005 cm to about 1.5 cm, and most preferably from about 0.05 cm to about 1.25 cm, wherein the length distribution of the cure promoting compounds may vary from about $X\pm0.1X$ to about $X\pm X$, preferably from about $X\pm0.2X$ to about $X\pm X$, more preferably from about $X\pm0.3X$ to about $X\pm X$, most preferably from about $X\pm0.4X$ to about $X\pm X$, and with best results between from about $X\pm0.5X$ to about $X\pm X$, where X is the average length of the cure promoting compound.

The average diameter of the cure promoting compound is from about 0.00005 to about 0.05 cm, preferably about 0.0005 cm to about 0.025 cm, and most preferably about 0.0005 to about 0.01 cm, where the diameter distribution of the cure promoting compound component in the mixture is equal to or less than about $Y\pm Y$, preferably from about $Y\pm0.2Y$ to about $Y\pm Y$, more preferably from about $Y\pm0.3Y$ to about $Y\pm Y$, most preferably from about $Y\pm0.4Y$ to about $Y\pm Y$, and with best results from about $Y\pm0.5Y$ to about $Y+Y$, wherein Y is the average diameter of cure promoting compounds in the mixture. The diameter may vary widely as indicated above with respect to length distribution.

Techniques for forming the various shapes of the cure promoter compounds are well known in the art and described in, for example, Savage Carbon-Carbon Composites (1993).

In general, "cure promoting" compounds suitable for use in this invention include the materials whose conductivity promotes the coupling of electromagnetic energy, preferably microwave energy. Microwaves have wavelengths from about 100 cm to about 0.1 cm at frequencies of from about 0.3 GHz to about 300 GHz. Illustrative of these "cure promoting" compounds are those which include carbon such as fullerines, graphite, and diamond; metal such as aluminum (Al), iron (Fe), copper (Cu), cobalt (Co), magnesium (Mg), and molybdenum (Mo); mixed valent oxides such as ferric oxide ($FeO_3$), cuprous oxide (CuO), cobalt trioxide ($Co_2O_3$), nickel oxide (NiO); and sulfide semiconducting materials such as lead sulfide (PbS), iron sulfide ($FeS_2$), and copper iron sulfide ($CuFeS_2$), and mixtures thereof. Preferable cure promoting compounds include graphite and magnetic particles such as iron, ferric oxide, iron sulfide, and copper iron sulfide, with graphite being more preferred.

We have found that by incorporating an effective amount of such cure promoting components having the specified configurations, and distributing such components according to the specified ranges in the composition of the present invention, these cure promoting components contribute to the reduction of the molding/curing cycle time and the increase in the heating efficiency of the composition without detrimentally effecting the performance of the resultant friction material. By "effective" amount of cure promoting compounds as used herein, it is meant the amount of "cure promoting" compound required to obtain the degree of cure desired. One skilled in the art can readily determine the appropriate amount and size of the cure promoting compound needed to provide the desired degree of cure. It is believed that each of the cure promoting compounds functions as a "conductor" which absorbs and generates heat in the presence of electromagnetic energy and thus accelerates the cure rate of the composition of the present invention.

The composition of this invention may also include additional components for appearance and property improvements. Such other additives include particulate fillers, colorants, antioxidants, stabilizers, and the like. The nature of such additives will vary widely and will depend upon the nature of the cure promoting compound or compounds and matrix contained in the composition, intended uses of the composition, and the like. The amounts of such additives may vary widely. The amount of the additives may vary between about 0 to about 80percent based on the total weight of the composition, preferably from about 30 to about 50 percent on the aforementioned basis.

Commercially available impact modifiers, such as rubber, i.e. ground rubber, and elastomers may also optionally be used in the present composition. Such impact modifiers may be used in amounts of from about 0 to about 30, preferably from about 0.5 to about 10 based upon the total weight of the composition.

A pH regulator, such as calcium hydroxide ($Ca(OH)_2$) may also be used in the composition of the present invention in amounts of from about 0 to about 35 percent, preferably from about 0 to about 10 percent, based upon the total weight of the composition.

The composition of the present invention may be made by combining all of the essential ingredients as well as any optional ingredients via conventional mixing techniques well known in the art, such as dry blending, melt blending, or blending in extruders or other types of mixers, under ambient conditions.

Figure 1B:
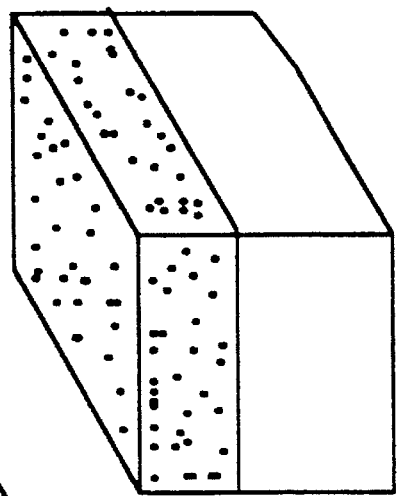
Figure 1A:
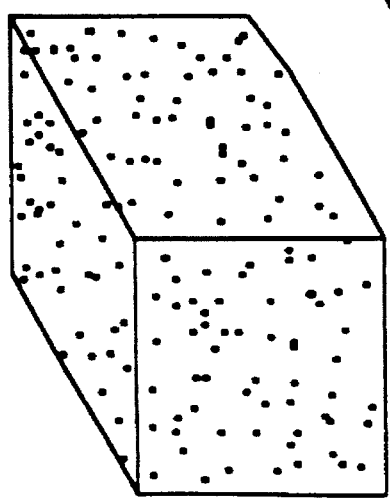

Cure promoter compounds suitable for use in the present invention may be arranged within a friction material in any one of the combinations illustrated in FIG. 1, which shows, for example, cure promoting compounds in particle form. For example, the friction material can be a unitary structure comprised of a cure promoting compound or compounds uniformly dispersed throughout as shown in FIG. 1a. Alternatively, the material may be a multilayer construction comprised of: 1) one layer comprised of the cure promoting compound or compounds adjacent to a layer comprised of the composition of the present invention without cure promoting compounds (FIG 1b); or 2 ) one or more layers comprised of cure promoting compound or compounds sandwiched between two or more layers comprised of the composition of the present invention without cure promoting compounds (FIG. 1c).

The composition, when cured, has a low percentage of acetone extractables which signifies a high degree of cure, i.e. greater than about 99 percent, when the cured composition is extracted with acetone according to the method provided in French, "Crosslink Density from Sol-Gel Contents," A11(3) J. Macromol. Sci. 643–666 (1977). This is because as the molecular weight of a compound increases during crosslinking, its solubility in acetone decreases.

The composition of the present invention may be made into various articles of manufacture, examples of which include friction materials such as drum linings, clutches, and brake pads for automobiles, trucks, planes, trains, bicycles, and the like.

An alternative embodiment of the composition of the present invention includes the cure promoter compounds, such as continuous carbon and graphite fibers, and matrix in a carbon-carbon composite arrangement. Such carbon—carbon composite materials are particularly suitable for use in aircraft or racing car brakes. Cure promoter compounds having an aspect ratio approaching infinity, i.e. filaments, are preferred for use in carbon—carbon composites. Such carbon—carbon composites may be made by way of conventional methods known in the art, such as by means of resin transfer molding, impregnation, and pultrusion. See Savage, Carbon—Carbon Composites (1993).

Another aspect of this invention is directed to a method of manufacturing a friction material comprising the initial step of blending the matrix, filler, fiber and friction modifier, as well as any other optional ingredients, using conventional techniques, such as dry blending or melt blending, or blending in extruders or other types of mixers.

The resulting blend is then shaped into the form of the desired end product, typically by filling a mold having the appropriate shape and size desired with the blend. Any conventional techniques for placing the blend into molds as well as for transporting said molds or the friction materials themselves to heating chambers may be used. Such techniques are well known in the art and described in U.S. Pat. Nos. 4,617,165, 4,537,823 and 4,605,595.

The size, shape, and composition of the molds may vary based upon the desired end use of the friction material article. The size, i.e. width and length, of the molds are generally larger, i.e. from about 0.05 cm$^3$ to about 300,000 cm$^3$ in those instances where the article is to be used as a brake pad or drum lining for stopping heavy vehicles. Conversely, where the article is intended for use as a means for stopping smaller vehicles, i.e. bicycles, then the molds are generally smaller.

The shape of the mold may be irregular or regular. Illustrative of useful shapes include, for example, cubic, rectangular, cylindrical, and polygonal such as triangular, pentagonal, and hexagonal. In the preferred embodiment of the invention, the molds are cubic, rectangular or cylindrical. The shape of the mold further depends on the arrangement of the cure promoting compound, i.e. unitary or multilayer structures as discussed above.

The molds should be comprised of a materials such as polymer composites, i.e. glass fiber reinforced composites, or metals which will withstand the high curing temperatures employed herein.

While in the heating chamber, the friction material, while either within the mold or after it has been pressed therefrom via conventional pressing means known in the art, is exposed to electromagnetic radiation supplied at a power of at least about 0.05 W, preferably from about 0.05 W to about 1000 KW, and more preferably about 500 W to about 500 KW, and a frequency of from about 0.954 GHz to about 2.45 GHz. Magnetic (or "inductive") as well as dielectric (or "microwave") heating may be used as sources for the electromagnetic energy required in this invention. Microwave heating is preferred because it has a higher degree of selectivity with respect to heating only certain compounds in the composition of the present invention.

The friction material is exposed to the radiation at a temperature of from about 10° C. to about 2500° C., preferably from about 20° C. to about 300 ° C., for a time ranging between about 1 to about 3 hours, preferably about 3 to about 60 minutes, while in the heating chamber in order to cure the matrix in the friction material.

It is believed that by employing such conductive cure promoting compounds, the matrix and other components of the friction pad located adjacent to each respective cure promoting compound are heated and burned away upon exposure to electromagnetic radiation. This, as well as the phenomena that microwave energy heats matter from the inside out, contributes to the highly porous morphology of the friction materials of the present invention as compared to those materials cured by conventional means.

Accordingly, the porosity and overall strength of the friction materials of the present invention may be controlled by selecting the appropriate aspect ratio and distribution of the cure promoter compounds, which absorb both the electromagnetic energy and the concomitant increase in temperature during curing. All organic materials proximate to the cure promoter compounds may "burn off" during the exposure to electromagnetic energy, leaving holes or pores in the friction materials. By so adjusting the placement of the cure promoter compounds and thus the porosity for the composition, the friction resistance between the pad and the stator as well as the "noise" or may be controlled, i.e. as the porosity increases, the "noise" is reduced.

Because the waves of electromagnetic energy are not only absorbed into the surface of the friction material but also are reflected off of the plate on which the friction material rests during curing, the resulting friction material possesses a gradient crosslinking morphology. This means that the during the curing process, the surface of the friction material is exposed to higher temperatures, undergoes a higher degree of cure, and thus forms a scorched surface layer having a depth which may vary from about 0.0005 cm to about 1.5 cm, preferably from about 0.01 cm to about 0.3 cm. The friction material-plate bond is also advantageously not weakened during the curing process since the layer of friction material adjacent to the backing plate is only exposed to low temperatures due to the energy waves reflecting therefrom.

The following examples are presented to provide a more complete understanding of the invention. The specific techniques, conditions, materials, proportions, and reported data set forth to illustrate the principles and practice of the invention are exemplary and should not be construed as limiting the scope of the invention.

The following properties of the cured materials produced according to the Examples were determined as follows:

a) Strength (Pa) and Density (gm/cc)

Samples having a circular surface diameter of about 1.95 cm (0.75 inches) and thicknesses of about 1.905 cm (0.25 inches) are tested for density via gravimetry. In order to test for compressive strength, other samples having similar dimensions are placed in the platen of a hydraulic press equipped with a force gauge. The compressive strength is determined by dividing the ultimate force required to destroy the sample divided by the surface area of the sample. The flexural strength is measured via the method described in ASTM D790.

b) Porosity

The porosity of samples are calculated from the density as follows:

% porosity =100 × {theoretical density - actual density}/ theoretical density, wherein the theoretical density is equivalent to the sum of the specific densities of the components.

c): Dynamic Mechanical Properties

The Young's Modulus (Pa) and Tan $\delta$=(lost Young's Modulus)/Stored Young's Modulus) of samples are measured via the method described in Ferry, "Viscoelastic Properties of Polymers," 124 (3rd Ed. 1978) and Nielsen, "Mechanical Properties of Polymers and Composites," 54 (1976).

Each sample or strip, which have dimensions of about 3.8 cm × about 0.635 cm × about 0.312 cm, is placed into a Rheometric Dynamic Spectrometer obtained from Rheometrics, Inc. and was heated at a rate of about 3° C./minute and a strain cycle frequency of about 1 Hz in the presence of argon. The temperature range studied is from 25° C. to 400° C.

d): Heat of Curing (J/g)

Each sample is ground into powder form via mortar and pestle. About 8.5 mg to about 10 mg of the powder is heated for 2 minutes in a Series Thermal Analysis System Differential Scanning Calorimeter o obtained from Perkin-Elmer at temperatures of from about 10° C. to about 50° C. and at a scanning rate of about 5.0 degrees/minute in the presence of nitrogen.

e): Acetone Extraction

For about 10 minutes, a glass fiber thimble is dried in a Fisher Scientific isotherm vacuum oven preheated to about 110° C. The thimble is then placed in a Fisher Scientific desiccator set at room temperature for another 10 minutes, then weighed. Samples of a molded article are crushed into a powder, which is then placed into the cooled thimbles and weighed. The powder-filled thimble is extracted with acetone under reflux for about 2 hours in a glass reflux machine obtainable from Fisher Scientific. The powder-filled thimble is then placed in the above, room-temperature desiccator for 20 minutes then weighed.

f) Friction and Wear

The friction and wear of the sample of molded articles are evaluated by the Chase Test (Test method SAE J661).

EXAMPLE 1

Preparation of a Friction Material Composition 3.0 g of a poly(aromatic amide) pulp obtained from DuPont Chemical under the tradename "Kevlar" are mixed with 0.4 g. of graphite powder having a particle diameter of about 0.03 cm in approximately a 0.5 liter (two quart) Patterson-Kelly blender at a speed of 3825 rpm for about 3 minutes. 6.0 g. of graphite chips having a particle size of about 0.124 cm and 4.9 g. of antimony trisulfide are added thereto, and the resulting mixture is then mixed for an additional 5 minutes at about 3825 rpm.

6.1 g. of a thermosetting phenolic resin obtained from Borden Chemicals (Ohio) under the tradename "Durite FD-2166A" which contains about 7.5 weight % of a hexamethylene tetraamine curing agent, 3.4 g. of cashew nutshell friction dust, 4.5 g. of a ground rubber, and 33.2 g. of barium sulfate ($BaSO_4$) are then added thereto, followed by an additional 6 minutes of mixing at about 3825 rpm.

8.0 g. of mica were then added thereto, followed by 10 minutes of additional mixing at about 3835 rpm.

1.2 g. of carbon fibers having a L/D ratio of about 15,20 g. of copper fibers having a L/D ratio of about 6,6 g. of zinc powder having a particle diameter of 0.03 cm and 9.0 g. of sisal fibers having an L/D ratio of about 10 were added thereto, followed by 20 minutes of additional mixing at about 3825 rpm.

EXAMPLE 2

Molding of a Friction Material 120 g. of the composition produced in Example 1 is placed in a #9DT-0035 Raloid Tooles mold under ambient conditions. The mold is placed into the platens of a 40 ton Wabash press preheated to 250° C., then the press is closed.

After approximately 30 minutes of maintaining the pressure within the mold of the closed press at about 204 atm (3 kpsi), the temperature within the mold increases to about 148° C. The temperature of the press is then adjusted to "auto heat" and maintained thereat for about 3.5 minutes. The mold is then cooled to room temperature by running water through the interior of the platens for about 35 minutes.

COMPARATIVE EXAMPLE 3-1

Curing of Hot-Pressed Article By Conventional Heating

Samples of the molded article produced according to the method described in Example 2 are cured with circulating hot air for 14 hours in a Fisher Scientific oven preheated to 260° C. The results of the property evaluations of the cured samples are summarized in Table 1.

The temperature of the samples is about 110° C. upon entering the oven. After curing, cracks and floats are apparent in the cured samples. This illustrates that friction material compositions having elevated initial temperatures cannot be successfully cured by means employing conventional energy. Rather, it is necessary to cool the friction material to about room temperature before curing it in a conventional oven in order to produce materials without cracks and floats.

EXAMPLE 3

Curing by Microwave Energy

Samples of the molded article produced according to the method described in Example 2 are cured with microwave energy in a BPH 7000 microwave oven obtained from Cober Electronics under the conditions: 1.2 kW and 2.45 gHz for about 1 minute. The results of the property evaluations of the cured samples are summarized in Table 1.

TABLE 1

| Example | Density (g/cc) | Comp. Strength GPa (kpsi) | Acetone Ext.[1] (wt %) | Tg, °C. (max tan δ) | wt loss (%) | thickness loss (%) |
|---|---|---|---|---|---|---|
| Comp.Ex 3-1 | 2.453 | 0.0845 (12.3) | 1.10 | 249.0 | 2.6 | 3.3 |
| Ex 3; Sample 1 | 2.120 | 0.0779 (11.3) | 1.10 | 200.0 | 2.2 | 7.1 |
| Ex 3; Sample 2[2] | 2.367 | 0.0834 (12.1) | 0.877 | 259.0 | 2.7 | 3.8 |
| Ex 3; Sample 3[3] | 2.403 | 0.0848 (12.3) | 0.510 | 259.2 | 2.5 | 3.3 |

[1]For the fully cured pad, the maximum theoretical acetone extractables is 1.2239 wt %.
[2]Hot-pressing conditions: same as Sample 1 except mold temperature was 204° C. instead of 148° C.
[3]Hot-pressing conditions: same as Sample 1 except mold temperature was 234° C. at 408 atm (6 kpsi) instead of 148° C. at 204 atm (3 kpsi)

It can be seen from Table 1 that the article cured via electromagnetic energy possesses physical and tribological properties equivalent to or superior than those of the article cured via conventional heating.

The temperature of the samples upon entering the oven is about 110°C. After curing, no cracks or floats are apparent in the samples. This illustrates that friction material compositions of the present invention having elevated pre-cure temperatures can successfully be cured in microwave ovens. Therefore, the step of cooling the pre-cured composition is eliminated, which further reduces the cycle time of producing cured friction materials. Further, the amount of energy expenditure is also reduced since it is not necessary to heat the composition from room temperature in the oven during curing.

EXAMPLE 4.1

Effect of Chemical Ingredients-Cure Promoter

About 4 g of the phenolic resin of Example 1 is blended with about 1 g of various cure promoter compounds in a 150 mL beaker and stirred until homogenous. 5 gm of the resulting blend is formed into a pad and cured in the same manner and under the same conditions as described in Example 3, except that the curing time is 20 seconds. The results of the acetone extraction tests performed on the cured friction materials are found in Table 2.

TABLE 2

| | Acetone Extractables in Phenolic Resin in 5 Grams Sample After Microwave (1.2 KW, 2.45 GHz, 20 secs), wt % |
|---|---|
| phenolic | 100 % |
| phenolic/graphite 1 (graphite 1: L/D = 1.2; D = 0.08 cm) | 1.7 % |
| phenolic/graphite 2 (graphite 2: L/D = 1.1; D = 0.03 cm) | 0.0 % |
| phenolic/graphite 3 (graphite 3: L/D = 0.3; D = 0.124 cm) | 61.6% |
| phenolic/copper fiber (copper fiber: L/D = 6; D = 0.03 cm) | 0.0% |
| phenolic/zinc (Zinc: L/D = 1.0; D = 0.04 cm) | 100% |
| Phenolic/Sisal Fiber (Sisal Fiber: L/D = 10; D = 0.06 cm) | 100% |
| phenolic/carbon fiber (carbon fiber: L/D = 15, D = 0.03 cm) | 100% |

It can be seen from Table 2 that the size and type of cure promoters effect the degree of cure in the friction material. Clearly, graphite and copper fiber are effective promoters for the curing the phenolic resin by microwave energy, whereas the other components contribute very little to promoting the cure reaction. It is further evident that the graphite compound is more effective at a lower aspect ratio.

The governing parameters of the curing reaction by microwave energy are the friction materials': mass, specific heat, dielectric properties, geometry, heat loss mechanisms, coupling efficiency, power generated therein, as well as the output power of the microwave/dielectric heating. All things being equal, the rate of cure may be increased by increasing the output power to the electromagnetic heating unit within certain limitations. For example, an increase in input power from 1.2 kW to 7 kW, will decrease the cure time of the composition of the present invention from about 20 seconds to about 3 seconds.

EXAMPLE 4.2

Effect of Nature of the Matrix 50 g of a PT resin having a weight average molecular weight of about 3745, a number average molecular weight of about 1291, and a molecular weight distribution of about 2.9 obtained from AlliedSignal Inc, Morristown, N.J., and 50 g of the thermosetting phenolic resin of Example 1 are molded and cured in the same manner and under the same conditions described in Examples 2 and 3, except with a 60 second curing time. The acetone extractability of the cured composition is shown in Table 3.

TABLE 3

Effect of Resin on Cure

| | Acetone Extractables in Resin, wt % | |
|---|---|---|
| | Phenolic Resin | PT Resin |
| Resin (alone) | 79.5 | 54.42 |

It can be seen from Table 3 that PT resins are more reactive toward microwave energy, i.e. lower acetone extraction signifies a higher degree of cure, than the phenolic resins.

EXAMPLE 5

Gradient Cure

Samples of the article produced according to the method described in Example 2 are cured for about 1 minute with microwave energy in the oven of Example 3 under the conditions: 3.6 kW and 2.45 GHz. Test strips having dimensions of about 3.8 cm × about 0.635 cm × about 0.312 cm, are taken from the top (friction surface), middle, and the bottom (adjacent to the metal plate) of the cured samples. The dynamic mechanical and acetone extraction properties of the samples are summarized in Table 4.

TABLE 4

| Sampling Position | DMA, (Tan δ value) | Tg at peak value of Tan δ (°C.) | Acetone Ext. (Wt %) |
| --- | --- | --- | --- |
| Top (friction surface) | 0.028 | 260.0 | 0.70 |
| Middle | 0.040 | 220.0 | 0.73 |
| Bottom (adjacent to the metal plate) | 0.065 | 206.0 | 0.94 |

"Tan δ" is used to measure the damping of the friction material. More specifically, the higher the Tan δ, the lower the degree of cure and the greater the damping capabilities of the material.

It can be seen from Table 4 that a test strip cured with microwave energy possesses a gradient cure, with its bottom layer having a lower degree of cure, i.e. higher acetone extraction and glass transition temperature, and thus a greater degree of viscoelasticity than its top surface layer. Because this bottom layer retains much of its viscoelastic nature after curing, the resulting test strip is capable of absorbing a great amount of vibrational energy created during actual braking. Therefore, not only are the impact properties of the pads of the present invention improved, but also the propagation of noise therethrough is reduced.

By contrast, because a brake pad cured in a conventional oven is uniformly cured throughout, it has a lower viscoelasticity and thus inferior damping and impact properties.

Having thus described the invention in rather full detail, it will be understood that such detail need not be strictly adhered to but that further changes and modifications may suggest themselves to those skilled in the art, all falling within the scope of the invention as defined by the subjoined claims.

It is claimed:

1. A composition comprised of:
    a) a cure promoting compound, and
    b) a matrix resin for binding the components of said composition, said matrix resin is composed of a thermoplastic resin, a thermoset resin, and combinations thereof,
wherein an effective amount of said cure promoting compound has an effective aspect ratio such that said composition is rapidly cured in the presence of electromagnetic enemy.

2. The composition of claim 1 wherein said cure promoting compounds have a dielectric loss of from about 0.000001 to about 1.0, and a resistivity of from about $1 \times 10^{-10}$ to about $1 \times 10^{+8}$ ohms-cm.

3. The composition of claim 2 wherein said cure promoting compounds are selected from the group consisting of fullerines, graphite, diamond, aluminum, iron, copper, cobalt, magnesium, molybdenum, ferric oxide, cuprous oxide, cobalt trioxide, nickel oxide, lead sulfide, iron sulfide, copper iron sulfide and mixtures thereof.

4. The composition of claim 1 wherein said matrix is selected from the group consisting of a thermoplastic resin, a thermoset resin, and combinations thereof.

5. The composition of claim 4 wherein said matrix is a cyanated phenolic, a phenolic-triazine copolymer, and copolymers and mixtures thereof.

6. The composition of claim 1 wherein said cure promoting compound is a fiber selected from the group consisting of synthetic fibers, inorganic fibers and mixtures thereof.

7. The composition of claim 6 wherein said fiber is aligned in a substantially parallel and unidirectional manner.

8. The composition of claim 6 wherein a plurality of said fiber is arranged in at least one layer, wherein the rotational angle between said fibers in said layer is from about 0° to about 90°.

9. The composition of claim 8 wherein said fiber is arranged in at least two layers, wherein the rotational angle between said fibers in one layer to said fibers in another layer is from about 0° to about 90°.

10. The composition of claim 1 wherein said cute promoting compound is randomly dispersed in said composition.

11. The composition of claim 1 wherein said pure promoting compound is a friction powder, an abrasive friction modifier, a lubricant friction modifier, and mixtures thereof.

12. The composition of claim 1 wherein said aspect ratio is greater than about 0.1.

13. The composition of claim 1 wherein said aspect ratio is greater than about 0.3.

14. The composition of claim 1 wherein said matrix and said cure promoting compound are in the form of a carbon-carbon composite.

15. An article of manufacture comprised of the composition of claim 1.

16. A composition comprising:
    a) a phenolic-based matrix; and
    b) a cure promoting compound wherein said cure promoting compound is comprised of copper fiber, iron powder and graphite;
wherein an effective amount of said cure promoting compound has an effective aspect ratio such that said composition is rapidly cured in the presence of electromagnetic energy.

17. A method of making a friction material comprising:
    a) combining a matrix and a cure promoting compound, wherein said matrix is composed of a thermoplastic resin, a thermoset resin, and combinations thereof, and an effective amount of said cure promoting compound has an effective aspect ratio such that said friction material is rapidly cured in the presence of electromagnetic energy, in a container to produce a mixture of materials;
    b) shaping said mixture into said friction material; and
    c) exposing said friction material to electromagnetic radiation under conditions sufficient to cure said matrix.

18. The method of claim 17 wherein said electromagnetic radiation is selected from the group consisting of microwave energy and magnetic energy.

19. A friction material for use in a brake pad having a coefficient of friction which varies from a wear surface to an engagement surface with a backing plate, said friction material being manufactured by:
    a) combining a binder and cure promoting compound having an effective aspect ratio whose conductivity promotes the coupling of electromagnetic energy to form a mixture, said binder is composed of a thermoplastic resin, a thermoset resin, and combinations thereof, and;
    b) placing said mixture in a mold;
    c) subjecting said mixture while in said mold to electromagnetic radiation for a time sufficient to develop a desired thermal reaction in said cure promoting compound such that said binder is cured.

20. The friction material of claim 19 wherein said curing creates voids that dampen and absorb noise in said resulting friction material.

21. The article of manufacture of claim 15 wherein said article is a friction material.

22. The use of the composition of claim 1 as a friction material.

* * * * *